M. A. WERTMAN.
AUTOMATIC MACHINE TOOL.
APPLICATION FILED JULY 8, 1918.
1,351,884.
Patented Sept. 7, 1920.
3 SHEETS—SHEET 1.
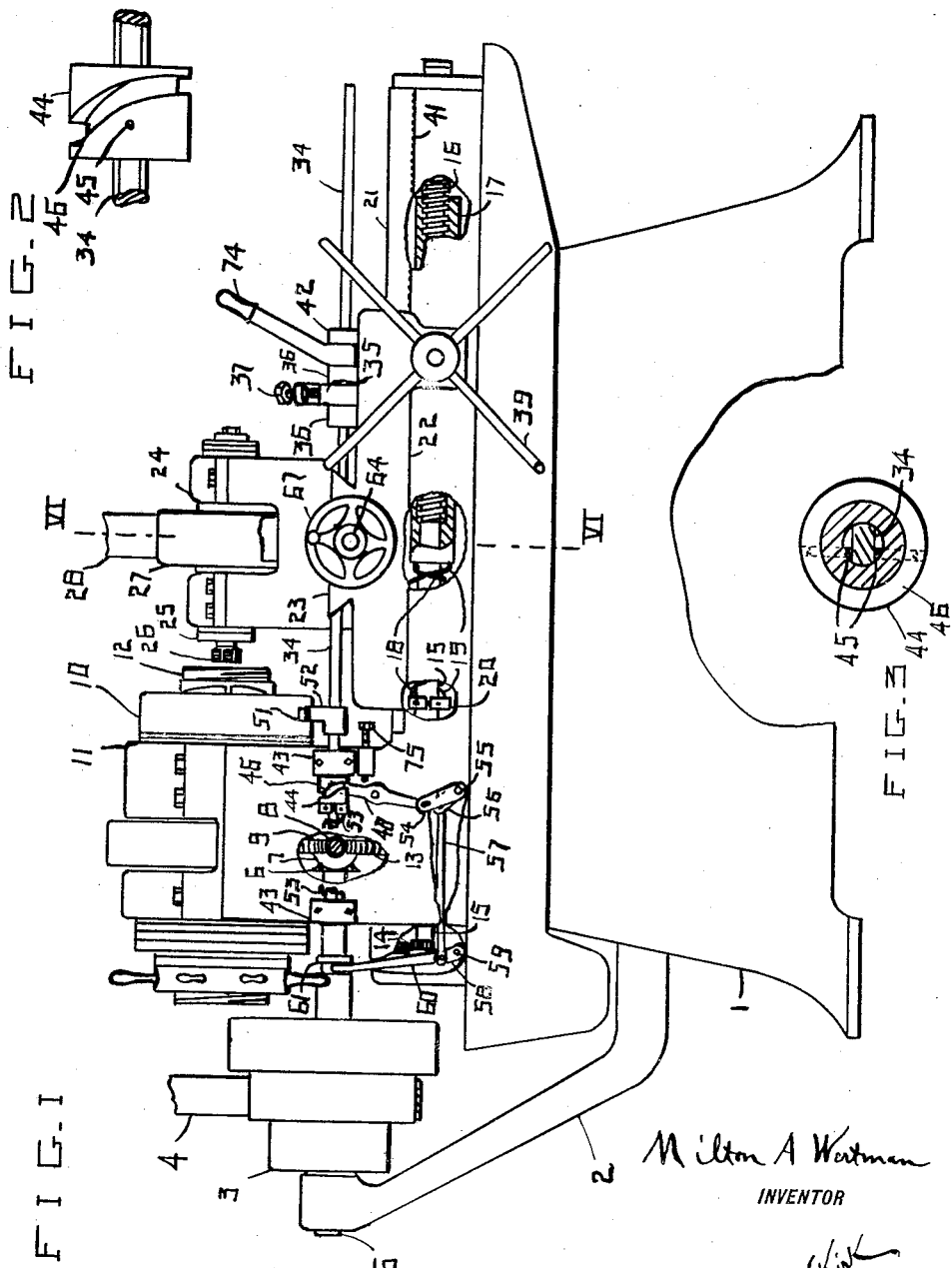
Milton A Wertman
INVENTOR
BY Geo O Kirk
ATTORNEY

M. A. WERTMAN.
AUTOMATIC MACHINE TOOL.
APPLICATION FILED JULY 8, 1918.

1,351,884.

Patented Sept. 7, 1920.
3 SHEETS—SHEET 2.

Milton A Wertman
INVENTOR

BY Geo E Kirk
ATTORNEY

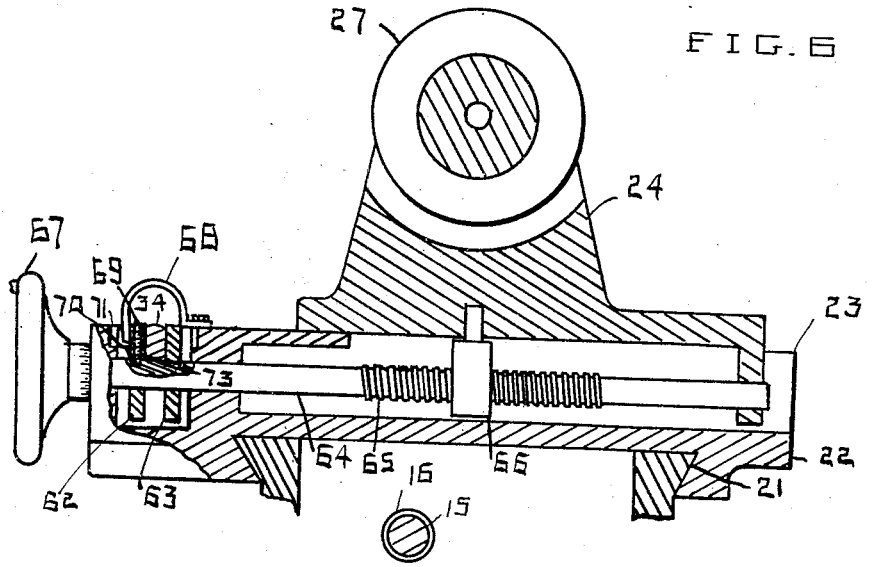

UNITED STATES PATENT OFFICE.

MILTON A. WERTMAN, OF DAYTON, OHIO, ASSIGNOR TO THE BIGGS-WATTERSON CO., OF CLEVELAND, OHIO, A CORPORATION OF OHIO.

AUTOMATIC MACHINE-TOOL.

1,351,884. Specification of Letters Patent. Patented Sept. 7, 1920.

Application filed July 8, 1918. Serial No. 243,884.

*To all whom it may concern:*

Be it known that I, MILTON A. WERTMAN, a citizen of the United States of America, residing at Dayton, Montgomery county, Ohio, have invented new and useful Automatic Machine-Tools, of which the following is a specification.

This invention relates to automatic control devices for machine tools.

This invention has utility when incorporated in power actuated machines, especially of the thread miller type, wherein it may operate automatically at the end of the cycle of milling to throw the cutter away from the work, stop the driving of the work, and diconnect the cutter from the feed drive.

Referring to the drawings:

Figure 1 is a side elevation of a thread miller machine tool embodying features of the invention;

Fig. 2 is a detail view on an enlarged scale, of the cam for throwing out the driving means actuating the work;

Fig. 3 is a transverse section of the cam of Fig. 2;

Fig. 6 is a fragmenetary view on the line VI—VI, Fig. 1, showing the automatic transverse shift device for moving the tool or cutter out of the work;

Fig. 7 is a detail view of the resetting handle for the automatic stop mechanism herein;

Fig. 8 is a fragmentary view on an enlarged scale of the shift controlling disks; and Fig. 9 is a plan view of said disks of Fig. 8.

Figure 4:
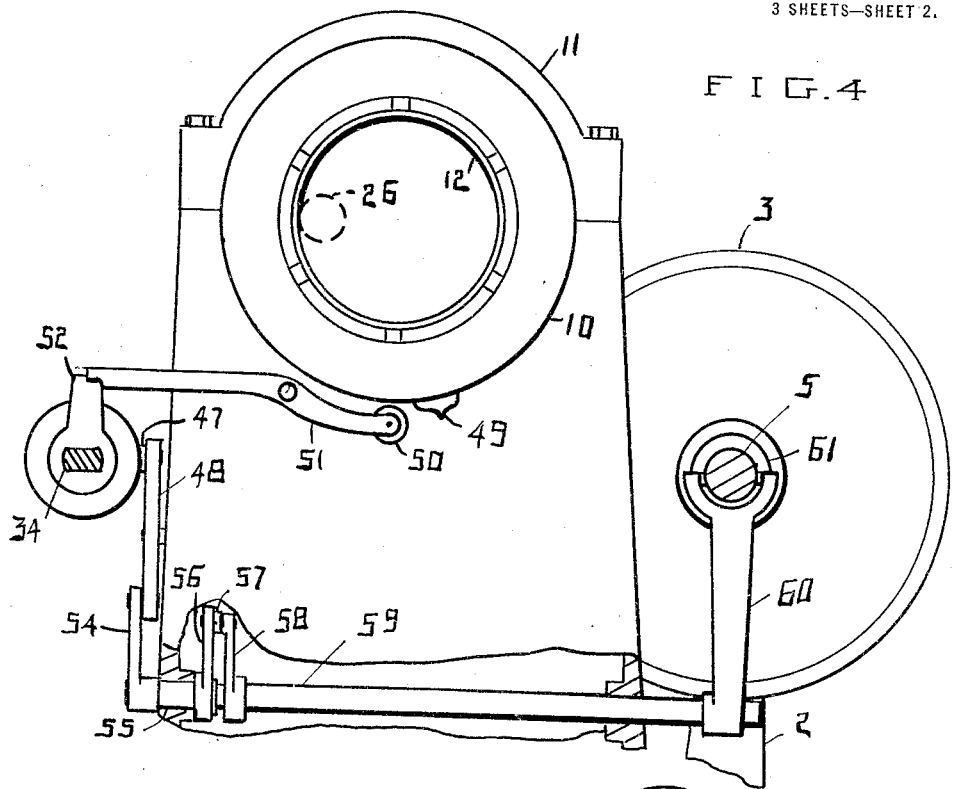
Fig. 4 is a view of the work holder trip mechanism with the throw out connections for the work holder drive.

The machine tool may comprise the main frame or base 1, provided with a bracket 2 with provision for effecting different speeds as a stepped driving pulley 3, driven by a belt 4 for operating a shaft 5. This shaft 5 through bevel pinions 6, 7, rotates transversely extending worm shaft 8 in mesh with worm wheel 9 about the holder 10 for rotating such holder 10 in a bearing or housing 11 carried by the main frame or base 1. This rotary holder 10 is shown as mounting work 12.

Figure 5:
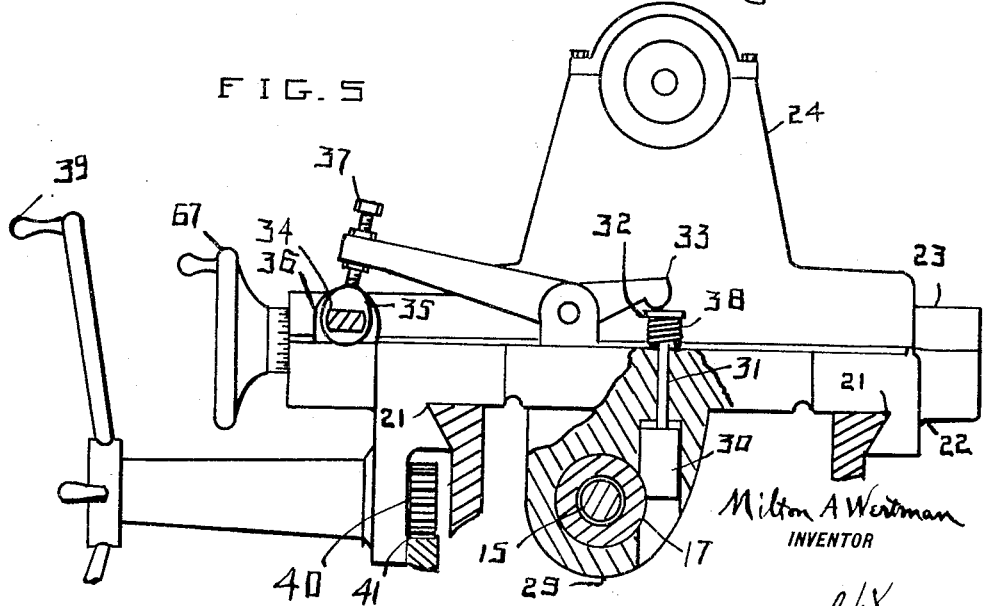
Fig. 5 is a transverse view of the machine tool, parts being broken away, to show the automatic release device for the cutter feed.

Oppositely of the shaft 8 there is worm wheel 13 operating through gearing 14 as a drive for feed shaft 15. The gearing for driving the work spindle and the feed shaft may be as shown in applicant's co-pending Patent #1,308,152, granted July 1, 1919. This feed shaft, axially fixed, extends longitudinally of the machine and has a threaded portion 16 coacting with a nut 17. Helical springs 18, 19, about the shaft 15 extend from the nut 17 to a friction disk 20 clamped to the shaft 15. These springs normally urge the nut 17 toward a medial or neutral position when released from feed driving rotation, as shown by the device of Fig. 5.

Longitudinally of the main frame 1 extend guides 21 for a main carriage 22 upon which, transversely directed by guides 23 is the auxiliary or tool holder carriage 24 provided with a holder 25 for a milling cutter tool 26. This holder 25 is rotated in the carriage 24 by pulley 27 driven by belt 28. The carriage 22 has a downward extension 29 through which the nut 17 loosely extends. To effect longitudinal travel of the carriage 22 along the guides 21, the nut 17 is clamped to this carriage by the friction block 30 having upwardly directed stem 31 to a head 32, positively forced downward into locking position by lever 33.

Extending parallel to the guides 21 is a flattened shaft 34 serving as the main control element in the automatic stop mechanism herein disclosed. Mounted on this shaft 34 for loose sliding therealong, but held by the flattened shaft 34 against rotation independently thereof is a cam 35. This cam 35 is maintained in alinement with the lever 33 by the pair of bearings 36 on the carriage 22, through which the shaft 34 extends. With the shaft 34 set as shown is Fig. 5, a set screw 37 may be adjusted for regulating the positive throw of the lever 33 in bringing the block 30 into clamping position for holding the nut 17 fast with the carriage 22. A release of the shaft 34 for a partial clockwise rotation, permits the compression helical spring 38 acting against the head 32, to draw the friction block 30 away from the nut 17. As thus released, the torsion springs 18, 19, reset the nut by winding it back on the threaded portion 16 to the position of starting. This release of the nut 17 from the carriage 22 leaves the carriage free to be manually operated, as retracting thereof for allowing supply of a new piece of work. This retracting may be effected by hand wheel 39 driving pinion 40 along the rack 41.

The shaft 34 has an additional bearing 42 on the carriage 22, as well as fixed bearings 43 adjacent the work holder 11 (Fig. 1). Between the bearings 43, this longitudinally fixed rock shaft 34 carries a cam 44, angularly adjustable thereon by set screws 45 (Figs. 2, 3). This cam 44 has an axially extending groove 46 engaged by a roller 47 on lever 48. Upon rotation of the holder 10 a full 360°, projection 49 (Fig. 4) rides against the roller 50 carried by lever 51 as a trigger, thus tripping this lever 51 free of arm 52 mounted on the shaft 34 against movement relatively thereto. This arm 52 is held in position against the lever 51 by a helical spring 53 extending from an adjustable friction collar on shaft 34 adjacent the cam 44, to the end bearing 43. When the projection 49 rocks the lever 51 clear of the arm 52, the helical spring 53 coiled about the shaft 34 with one end fast in the bearing 43 and the other end thereof fast in the cam 46 rocks the shaft 34 clockwise. This causes the cam 44, through its groove 46, to rock the lever 48 loosely connected to arm 54 mounted on shaft 55. The shaft 55, extending into the housing 1, carries an arm 56 connected by a link 57 with an arm 58 on a rock shaft 59 having an upstanding fork 60 for shifting clutch collar 61 away from the step cone driving pulley 3, for disconnecting the shaft 5 from driving.

The rocking of the shaft 34 at the predetermined rotation position of the work holder 10, not only automatically disconnects the driving means from rotating the work holder 10, but besides stopping the feed driving means, disconnects the carriage 22 therefrom by shifting the cam 35 so that the lever 33 rocks to permit the spring 38 to unclamp the nut 17.

Simultaneously with these automatic stop and disconnecting operations, a transverse automatic shifting of the carriage 24 to move the tool out of the work, is effected, while the tool rotation is continued by means of the belt 28. Accordingly when such a continuous drive is used, no injury therefrom may be done to the completed work.

The automatic transverse carriage shift, or tool throw-out as to the work, is mounted to be actuated by the shaft 34 (Fig. 6). The shaft 34 spaces disks 62, 63, mounted on the transverse shaft 64. This shaft 64 is normally fixed against longitudinal movement as to the carriage 22 and has threaded portion 65 carrying a nut 66 engaging the carriage 24. Accordingly, by rotating the hand wheel 67, the carriage 24 may be shifted transversely of the carriage 22, by traveling in the guides 23. In its tripping throw or rocking, the shaft 34 is shown as moving from its position shown in Figs. 4, 5, 7, to the position shown in Fig. 6. This brings the flattened sides of the shaft 34 vertical. To avail of this fact for transverse automatic shifting of the carriage 24, say to the right in Fig. 6 in the instance of internal milling, a spring 68 is mounted on the carriage 22 to extend outwardly over the disks 62, 63, the outer disk 62 being made fast with the shaft 64 by a set screw 69 entering recess 70 in the shaft 64. The other disk 63 is left loose. Clearance recess 71 is provided in the carriage 22 for the free end of the spring 68. When the shaft 34 is rocked by the spring 53, upon the lever 51 being tripped, the shaft 64 which was held against longitudinal movement by the set screw 69 in the disk 62, is now shifted inward by the spring 68. Accordingly the nut 66 also shifts and moves the carriage 24 with the tool 26 to position the tool 26 clear of further cutting action upon the work.

For external milling or cutting, the spring 68 is reversed to have its free end inward in the clearance recess 72 and the disk 63 is connected to the shaft 64 by the set screw 69, removed from the disk 62 and positioned to engage recess 73. When the work thus finished has been replaced, the drive may be readily reconnected up simultaneously as to the three features thrown out by the shaft 34, by swinging the handle 74, angularly fixed with the shaft 34 and slidable therealong with the carriage 22 between the bearings 36, 42. However, before thus swinging the handle 74 to vertical position, the carriage 22, if retracted, is brought up to starting position as to the work, by abutting the adjustable stop 75 (Fig. 1). Even if not retracted, the feed travel for the preceding piece of work operated upon has left the carriage 22 in improper position, and accordingly the hand wheel 39 should be used to bring the tool into a position lateral of its starting position in the new work.

The delicate adjustment possible in setting the cam 44, may be such, that in the swinging of the handle 74 upward, the shaft 34 has brought the tool 26 to have a slight time interval in cutting into the new work its depth of milling before the clutch fork 61 is so thrown that the holder 10 begins its cycle of rotation in coöperating for cutter tool progress circumferentially in the work. In thread cutting, the cutter 26 may have as many annular series of teeth as it is desired to form on the work, and the feed travel of the carriage 22 may be a pitch of said thread in the single rotation of the holder 10, to complete the cycle of operations. Then, the projection 49, acting to trip the lever 51, releases the shaft 34 for rocking, in unclutching the driving means from rotating the holder 10, and while disconnecting the driving means for feeding, the carriage 22 is unclamped from the feed nut 17. The tool rotation driving means is shown herein as independent but it is rendered ineffective by the spring 68 shifting the carriage 24 to move the tool 26 out of the finished work.

Unskilled operators may readily handle a plurality of these machines with great ease in setting the work and tool accurately, while danger of over-running is absolutely precluded, thus contributing to quantity of proper grade output.

What is claimed and it is desired to secure by Letters Patent is:

1. A first holder, driving means for rotating said first holder, a second holder, driving means for rotating the second holder whereby tool and work coöperation between said holders may be effected, driving means for feeding one of said holders including a feed shaft, and a trip including a rock shaft parallel to the feed shaft, one of said holders being provided with means for operating the trip to disconnect two of said driving means.

2. A machine tool comprising first and second holders for tool and work coöperation therebetween, driving means for rotating the respective holders, a feed driving means for one of the holders including a feed shaft, and a trip including a rock shaft parallel to the feed shaft co-acting to be operated by one of the holders to disconnect a holder from rotation driving and to disconnect the feed driving means.

3. A machine tool including a tool holder, a work holder parallel thereto, rotatable driving means therefor, a rock shaft parallel to the axes of the holders, a trigger coacting with a rotary holder to trip the rock shaft, a feed device for one of the holders, and connecting means from the rock shaft to the feed device operable by the rock shaft for disconnecting the device from actuating the holder.

4. A machine tool including a tool holder, driving means for rotating the tool holder, a work holder, driving means for rotating the work holder, a feed device for progressing the tool holder as to the work holder, a rock shaft, a trigger coacting with the work holder for tripping the rock shaft, and control means from the rock shaft for disconnecting the feed device.

5. A machine tool including a tool holder, driving means for rotating the tool holder, a parallel axis work holder, driving means for rotating the work holder, a feed device for progressing the tool holder as to the work holder, a rock shaft parallel to the axes of the holders, a trigger coacting with work holder for tripping the rock shaft, and control means from the rock shaft for disconnecting the feed device and the work holder driving means, said rock shaft on resetting operable to reconnect the device and driving means.

In witness whereof I affix my signature.

MILTON A. WERTMAN.